Oct. 29, 1963 W. T. RENTSCHLER 3,108,528
PHOTOGRAPHIC LENS SHUTTER
Filed Nov. 24, 1959 3 Sheets-Sheet 1
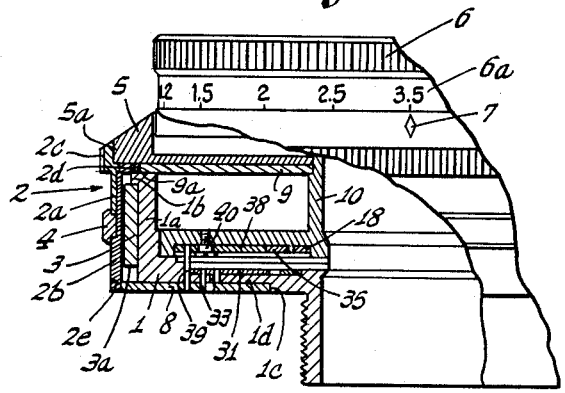
INVENTOR.
Waldemar T. Rentschler
BY
Munn, Liddy, Daniels & March
ATTORNEYS

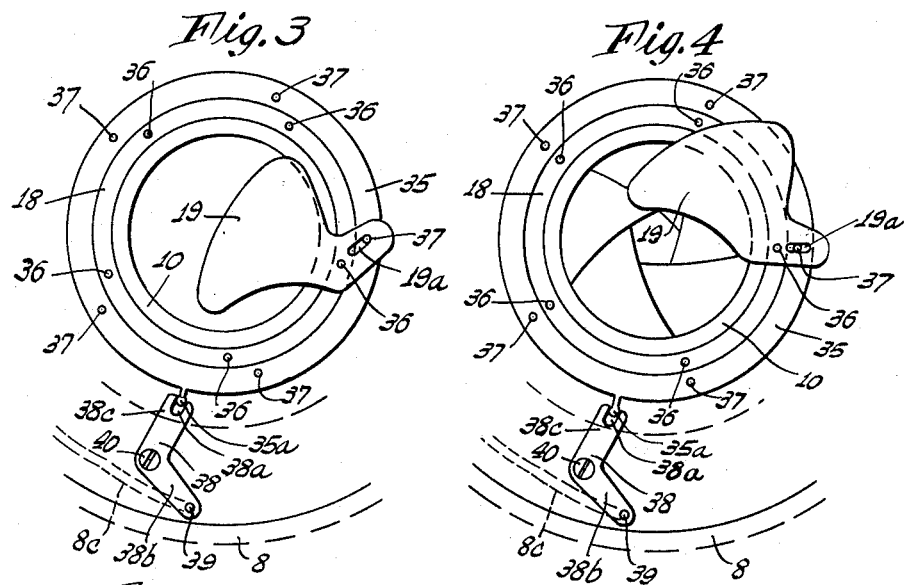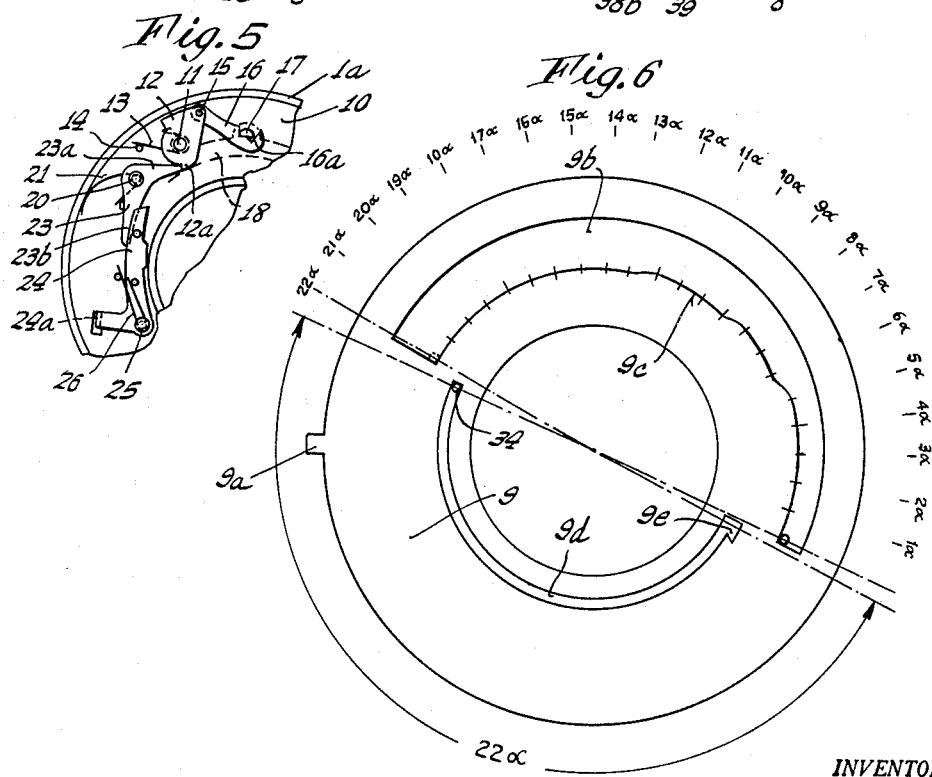

Oct. 29, 1963  W. T. RENTSCHLER  3,108,528
PHOTOGRAPHIC LENS SHUTTER
Filed Nov. 24, 1959  3 Sheets-Sheet 3
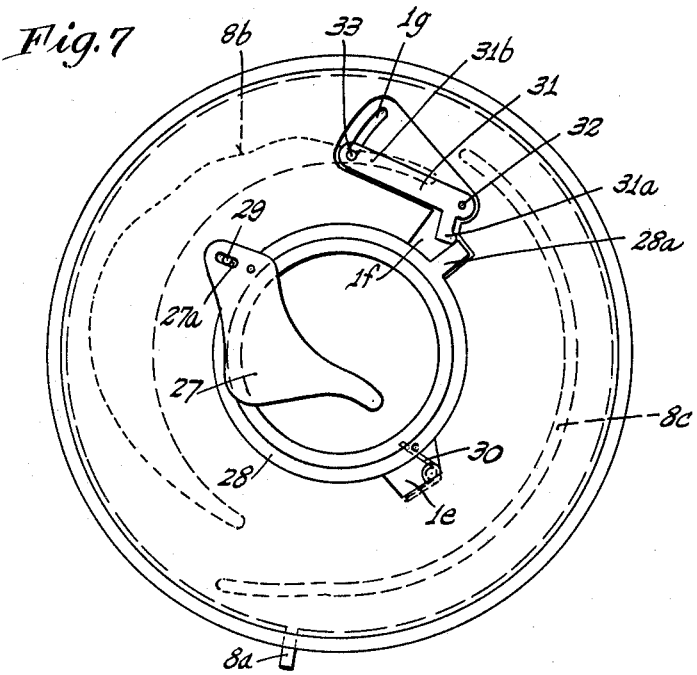
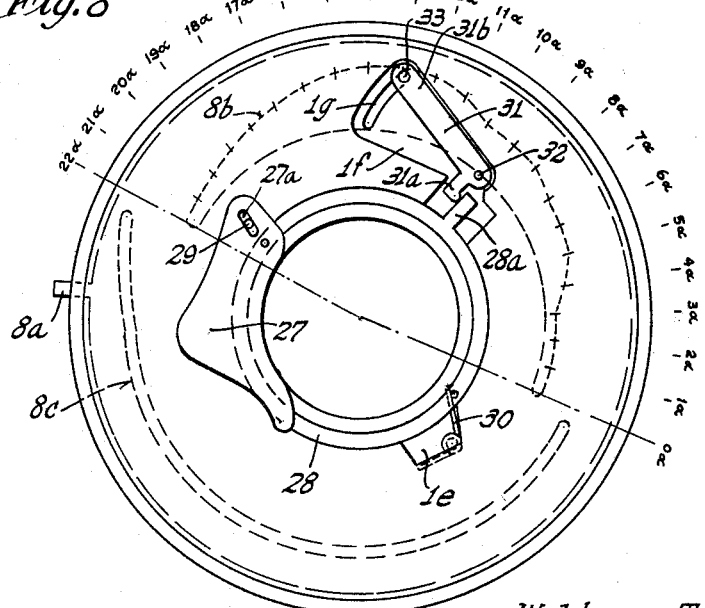
INVENTOR.
Waldemar T. Rentschler
BY
Munn, Liddy, Daniels & March
ATTORNEYS United States Patent Office 3,108,528
Patented Oct. 29, 1963

3,108,528
PHOTOGRAPHIC LENS SHUTTER
Waldemar T. Rentschler, Calmbach (Enz), Germany, assignor to Alfred Gauthier, G.m.b.H., Calmbach (Enz), Germany, a corporation of Germany
Filed Nov. 24, 1959, Ser. No. 855,058
Claims priority, application Germany Dec. 2, 1958
1 Claim. (Cl. 95—64)

This invention relates to a photographic shutter construction of the type having a built-in diaphragm which is settable to effect different aperture sizes, and having a plurality of reciprocable shutter blades each of which is under the control of the same two movable adjusting members, one of said adjusting members being operable by the shutter driving device or system.

An object of the present invention is to provide a novel and improved photographic shutter construction of the above-mentioned kind, wherein an exposure time which is possible with any one specific diaphragm aperture may be applied for all of the remaining setting positions or apertures of the diaphragm while at the same time there is obtained a reliable cooperation of the individual mechanisms of the shutter drive system, all with the expenditure of relatively few structural members and with small space requirements.

This object is accomplished, in accordance with the invention, by effecting a driving connection between that one of the two movable adjusting members which controls the shutter blades and which is not operable by the shutter driving system, and the setting device for the diaphragm, the end that the shutter blades may open to provide different sized exposure apertures and will always open at least the same amount that the diaphragm is set for.

The important advantage provided by the invention is due to the fact that the path of motion or extent of movement of the shutter blades, beginning with the initial movement of the same up to the point of reversal is variable and is under a positive control effected by the diaphragm setting means. With this organization the extent of movement of the shutter blades may be so regulated and proportioned that the blades will substantially just completely provide the necessary opening as determined by the diaphragm setting and aperture. In consequence of this an optimally short opening time of the shutter can be obtained for each diaphragm setting, since it is possible to limit the opening and closing time of the blades only to the extent which is absolutely required. This advantage is of special importance when setting a shutter for the shortest exposure time, since it is now possible in contradistinction to shutters as previously constructed, actually to obtain the shortest exposure time automatically with each different setting of the diaphragm, and to effect this while utilizing a constant shutter driving energy. As a consequence, there results an accuracy of exposure which has never heretofore been obtained with driving forces and driving systems of well known shutters. Also, in consequence of this, it is possible to obtain the said improved results with known driving forces and driving devices whereby the benefit is had of well-tested conditions with respect to tension and freedom from wear.

The organization as provided by the invention, wherein the path or extent of movement of the shutter blades to effect various different-sized full shutter openings under positive control of the diaphragm setting means provides, as stated above, special advantages in shutters of the type having separately operable setting devices for exposure time and diaphragm. In addition to the foregoing, there is further provided by the invention an advantageous construction having special utility and importance in shutters of the type wherein the speed and diaphragm setting devices are automatically coordinated and both adjustable by means of a single exposure value setting member which effects monotonous exposure value gradations.

In accordance with the invention, the diaphragm and speed setting devices when controlled by a single setting member may be so arranged that after the said single setting member has attained a position near one end of its movement, corresponding to the smallest diaphragm aperture and to the shortest exposure time for an opening of the shutter blades which is equivalent to the largest diaphragm opening, the diaphragm setting member is held stationary to maintain the diaphragm aperture at its smallest value while the single setting member is given a further adjusting range. During such further adjusting range the driving force of the shutter driving device is maintained at the same magnitude at least as that required for effecting the above-mentioned shortest exposure time and that adjusting member for the shutter blades which is not operated by the shutter driving system is automatically actuated simultaneously with the single setting member to effect a graded series of different sizes of full openings of the shutter blades, said series terminating in an opening which is equal substantially to the smallest diaphragm opening.

A shutter construction constituted in this manner is characterized by a substantially increased range of exposure time settings. This increased range is due to the fact that a number of ever-shortening exposure times is correlated with the smallest diaphragm aperture since the effective extent of movement of the shutter blades and hence the total opening time of the same becomes increasingly smaller, and since the additional shortening can be effected by an increase of the driving energy if this is required. The lower limit of the exposure times, that is, the fastest shutter speed obtained in this manner is far beyond the shortest known exposure time of intralens shutters as previously constructed.

This organization enables the present shutter to be used even with extreme light intensities and simultaneously with very highly sensitive films. Thus, the operating range of a camera which is equipped with the present shutter construction as provided by the invention is considerably extended even when a highly sensitive film is used. This is of special importance in connection with cameras which are provided with semi-automatic or else fully automatic exposure setting devices.

An especially economical construction of shutter arranged in accordance with the invention, which necessitates relatively few requirements with respect to the design and cooperation of the remaining shutter mechanism is obtained when the movable adjusting members of the shutter blades are constituted as two rings arranged concentrically with respect to the axis of the shutter, one of said rings cooperating with the shutter driving mechanism whereas the other ring is operably connected to the diaphragm setting device, the said connection being effected by means of a lever which has a pin or arm engaged with a control slot associated with the diaphragm setting member, the said lever also having a pin-and-slot connection to said other adjusting member or ring.

The accompanying drawings and the specification which follows illustrate and describe an embodiment of the invention constituted of a photographic lens shutter of the second kind described above, that is, the kind having speed and diaphragm setting devices which are adjusted or actuated by means of a single exposure value setting member which effects a monotonous exposure value gradation. The above-described advantages as well as others resulting from the invention will also be explained in detail.

FIGURE 1 is a fragmentary view partly in side elevation and partly in axial section, of a photographic lens shutter as provided by the invention, having an exposure value setting member and setting devices for the diaphragm and shutter speed, as well as a pair of movable adjustable members for adjusting and actuating the shutter blades.

FIG. 2 is a front view of the two movable adjusting or control members for the shutter blades, one of said members cooperating with the diaphragm setting member by means of an interposed transmission mechanism.

FIG. 3 is a fragmentary front view similar to that of FIG. 2, but showing in different positions the components illustrated in FIG. 2. The two adjusting members for the shutter blades and the said blades are shown in the positions they occupy when the shutter is closed and the diaphragm is set to effect the smallest aperture.

FIG. 4 is a fragmentary view similar to that of FIG. 3, but showing the adjusting members and the shutter blades in the positions which they occupy when the shutter is open, with the diaphragm set to effect the smallest aperture.

FIG. 5 is a fragmentary front view of the cocking or tensioning, driving and release mechanism of the shutter illustrated in the preceding figures.

FIG. 6 is a front elevational view of a cam ring arranged for setting the exposure time.

FIG. 7 is a front elevational view of the housing of the photographic lens shutter with a built-in sector diaphragm. The diaphragm is coupled with the exposure value setting member by a transmission mechanism, and the diaphragm is shown as set to effect the smallest aperture.

FIG. 8 is a front elevational view similar to that of FIG. 7, but showing the diaphragm fully opened.

Considering first FIG. 1, the housing of the photographic lens shutter is indicated by the numeral 1, and the exposure value setting member is shown at 2, said member being rotatably mounted on the front portion of the housing. The setting member 2 cooperates with an exposure meter of the camera (not shown) said exposure meter comprising the usual photoelectric cell and measuring mechanism. The connection between the exposure value setting member 2 and the exposure meter includes a control ring 3 which is concentrically mounted with respect to the shutter axis. A suitable type of exposure meter and transmission device arranged for cooperation with a control ring such as the ring 3 shown in FIG. 1, is illustrated and described in detail in copending application Serial No. 839,819 filed September 14, 1959, now Patent No. 3,022,714, and entitled Photographic Camera, and accordingly details of these structures are not given here.

As may be clearly seen from FIG. 1, the control ring 3 which constitutes a part of the coupling connected with the exposure meter rotatably bears on the side wall 1a of the shutter housing 1 and has on its back edge, facing to the rear of the shutter, a helical cam 3a adapted to engage a well known transmission pin (not shown) constituting a portion of the transmission for the exposure meter, said pin being shiftable longitudinally and being arranged parallel to the optical axis of the shutter. Instead of the cam 3a being engaged by the said well-known transmission pin, it will be understood that another suitable type of cam follower device operatively connected with the exposure meter may be utilized. The control ring 3 is restrained against forward axial movement by engagement with a collar or flange 1b provided on the side wall 1a of the shutter housing 1, and is held against rearward axial movement by a suitable holding member which is not shown in the drawings.

Also, as shown in FIG. 1, the exposure value setting member 2 is constituted as a two-piece ring which is positioned concentrically with respect to the shutter axis, the two pieces 2a and 2b of said ring overlapping one another and being drivingly connected together for simultaneous turning movement. To facilitate turning of the exposure value setting ring 2, a knurled rim 2c is provided on the outer periphery of the ring piece or member 2a.

In addition, a ring 4 is rotatably positioned on the outer periphery of the ring member or piece 2b, the ring 4 being held against axial movement and serving to set additional exposure factors, such as for example film sensibility or film factors as is further explained in the copending application above referred to.

The exposure value setting member 2 constituted of the two ring pieces 2a and 2b rotatably bears on the guide surface 5a provided on the outer periphery of a front plate 5. The setting member 2 is held against axial movement by the collar or flange 1b on the front portion of the side wall 1a of the shutter housing, which engages an internal flange 2d of the ring piece 2b. Also, the rear surface of the front plate 5 engages the internal flange 2d for this purpose.

The photographic range or distance setting of the camera is adjusted in a well known manner per se, by a range setting ring 6 provided in front of the front plate 5 of the shutter, the ring 6 actuating an adjustable front lens (not shown) and having a scale 6a which is referred to a stationary index mark 7.

Referring to FIG. 1, the exposure value setting member 2 is connected to the speed and diaphragm setting mechanisms, and for this purpose the diaphragm setting mechanism includes a control ring 8 which is rotatably carried on a collar or shoulder 1c at the rear of the shutter housing 1. The control ring 8 is connected to the exposure value setting member 2 by means of a lug 8a (FIGS. 7 and 8) which is provided on the ring and which engages a cooperable groove 2e (see FIG. 1) of the ring member or piece 2b. Thus, a coupling is established between the diaphragm setting ring 8 and the ring member 2b constituting a portion of the exposure value setting ring 2. The speed setting mechanism includes a ring 9 which is driven in a similar manner. The ring 9 rests on the front edge of the side wall 1a of the shutter housing and has a lug or tab 9a (FIG. 6) received in a cooperable groove (not shown in the figures) provided in the internal flange 2d of the ring member 2b. Adjustment of the exposure value setting member 2 thus actuates at one and the same time the diaphragm and speed control rings 8 and 9 which operate the setting mechanisms for the diaphragm and exposure time.

The shutter construction includes a base plate 10 which is secured in the interior of the shutter housing 1 and serves in a well-known manner to position the members of the well known shutter drive mechanism which is partly shown in FIG. 5. As seen in this figure, there is provided on the base plate 10 a tensioning and driving disc 12 for loading a shutter driving spring 13, the disk 12 being carried by a shaft 11 which passes through the rear wall of the shutter housing 1 and is connected to the film transporting or advancing mechanism of the camera in a well-known manner. The shutter driving spring 13 at one end engages the tensioning disk 12 and at its other end engages a stationary pin 14 on the base plate 10. The shutter driving mechanism also includes a catch or link 16 which is pivotally secured to the tensioning and driving disk 12 by means of a pin 15, the link 16 having jaws 16a engaging a pin 17 which is affixed to a shutter blade ring 18 rotatably mounted on the rear of the base plate 10. The shutter blade ring 18 serves in a well known manner for opening and closing shutter blades 19 only one of which is shown in FIGS. 2, 3 and 4 for the sake of clarity of illustration.

In order to hold the tensioning and driving disk 12 in cocked position a two-armed locking lever 23 is provided, acted on by a spring 21 which is carried on the pivot pin 20 for the lever 23. One arm 23a of the lever 23 cooperates with a shoulder or projection 12a of the driving disk 12 while the second arm 23b of the lever is cooperable with a release lever 24. The latter lever is pivotally mounted on a pivot pin 25 carried by the shutter base plate 10, and is biased clockwise by a spring 26. A rearwardly bent lug 24a of the lever 24 is connected with the camera release device, in a well known manner.

As seen in FIG. 1, the base plate 10 is spaced from the rear wall 1d of the shutter housing, to provide room for the shutter blades 19 and for the diaphragm setting mechanism which is shown in detail in FIGS. 7 and 8.

The present drawings and specification refer to and describe an intra-lens shutter having an iris type diaphragm characterized by sectors or segments. However, the invention is not limited to such type of diaphragm, since it has utility for any other kind. FIG. 7 shows the position of a diaphragm sector when the diaphragm is closed, and FIG. 8 illustrates the position of the sector when the diaphragm is fully open.

The reference character 27 indicates such diaphragm blade or sector which is arranged in the shutter housing 1, only one such blade being drawn for the sake of clarity of illustration.

The diaphragm sectors 27 are connected to an actuating ring 28 and have slots 27a into which stationary pins 29 project. The actuating ring 28 is biased in a counter-clockwise direction by a spring 30 disposed in a milled recess 1e provided on the inside of the rear wall 1d of the shutter housing 1. This bias imparted to the ring 28 causes an arm 28a thereof to remain engaged with a cooperable arm 31a of a two-armed lever 31. The lever 31 is disposed in another milled recess 1f provided in the inside of the rear wall 1d of the shutter housing 1, and is pivotally carried by a pivot pin 32. The other arm 31b of the lever 31 carries a pin 33 which extends through a slot 1g in the rear wall of the shutter housing and cooperates with a cam 8b connected to the exposure value setting member 2. The cam 8b is carried by the diaphragm setting ring 8 which is mounted on the rear wall of the shutter housing, and which is actuated in response to adjusting movement of the exposure value setting member 2 by means of the lug 8a, as previously explained. In FIGS. 7 and 8 the setting member 2 is not illustrated for purposes of clarity of illustration.

To improve the clarity of the explanation, and to facilitate a better understanding of the actuation of the speed and diaphragm setting or control rings as effected by the exposure value setting member 2 to produce a monotonous, that is, uniform exposure value gradation, the cams or control curves of the speed and diaphragm rings are illustrated in FIGS. 6 and 8, and the adjusting movement and range of the exposure value setting member is indicated or traced on the said cams in the form of steps or units having the angular value alpha (α). Shifting of the exposure value setting member 2 one step corresponds to a change of one exposure value. The exposure value steps or units are numbered in alpha units, in FIGS. 6 and 8, the numbers corresponding to the indicated steps provided on the control cams.

FIG. 6 illustrates the cam ring 9 which functions to set the shutter speed or exposure time. The cam ring 9 has a peripherally-extending arcuate recess or slot 9b along the inside edge of which there is provided a cam profile or setting curve 9c for the purpose of controlling a well-known exposure time or speed escapement mechanism. As can be seen from the scale of the angular (alpha) units indicated along the outside of the ring 9, the curve or cam edge 9c extends over a range of 22α (alpha). This same range also applies to the diaphragm setting curve or cam 8b shown in FIGS. 7 and 8.

Immediately here below there is a table which shows the manner in which the values of shutter speed and diaphragm are matched and correlated with the positions from 0 alpha to 22 alpha, in the illustrated embodiment of the invention.

| | alpha | $t=1/-$-sec. | $f=1:--$ |
|---|---|---|---|
| Shutter blades open to equal of diaphragm apertures smaller than the $f:2$ (largest) diaphragm aperture. | 0 | 2.000 | 22 |
| | 1 | 1.000 | 22 |
| | 2 | 500 | 22 |
| | 3 | 250 | 22 |
| | 4 | 250 | 16 |
| | 5 | 250 | 11 | Daylight Range.
| | 6 | 125 | 11 |
| | 7 | 125 | 8 |
| | 8 | 125 | 5.6 |
| | 9 | 60 | 5.6 |
| | 10 | 60 | 4 |
| Shutter blades open to equal of $f:2$ (largest) diaphragm aperture. | 11 | 60 | 2.8 |
| | 13 | 30 | 2.0 |
| | 14 | 30 | 2.0 |
| | 15 | 30 | 2.8 |
| | 16 | 30 | 4 |
| | 17 | 30 | 5.6 | Flashlight Range.
| | 18 | 30 | 8 |
| | 19 | 30 | 11 |
| | 20 | 30 | 16 |
| | 21 | 30 | 22 |
| | 22 | B | 22 | Bulb Setting.

In the above table, the range from 0 to 13 alpha corresponds to the daylight range of the camera, wherein the exposure times are suited exclusively for manually taken photographs, to prevent the spoiling of pictures by possible movement of the camera. The following range, i.e., from 14 alpha to 21 alpha is the flashlight range, for which an exposure time of 1/30 of a second is provided, for all diaphragm settings shown in the illustrated embodiment. The position 22 alpha, which is outside of the flashlight range, corresponds to the "B" or bulb setting position of the camera.

The relative arrangement or sequential position of the daylight range and flashlight range is not the subject matter of the present invention and is not essential in carrying out the invention. It has been described in detail in copending application Serial Number 839,819, filed September 14, 1959 and entitled Photographic Camera.

For the purpose of making "B" or bulb exposures, the cam ring 9 has, in addition to the speed regulating cam 9c, an additional recess 9d into which there extends a spring-urged arm 34 (FIG. 6) connected with a well known device (not shown) for carrying out bulb exposures. The control slot 9d is so arranged that the spring-urged arm 34 is held against movement during shifting of the ring 9 in the adjusting range from 0 to 21 alpha. Only in the position 22 alpha of the ring 9, for which position the slot 9d is widened at 9e, is the arm 34 able to shift during release of the shutter, for the purpose of maintaining it in open position.

As has been already mentioned, the movement of the shutter blades 19 is effected by means of the actuating ring 18 which is driven by the shutter drive illustrated in FIG. 5. In addition to operation of the shutter blades 19 by the actuating ring 18, provision is made for another adjusting member to additionally control the shutter blades, which latter adjusting member is not responsive to the shutter drive device of FIG. 5. This other adjusting member or ring is illustrated in FIGS. 2, 3 and 4, and is given the reference numeral 35. As can be seen from these figures, the shutter blades 19 are connected to the ring 18 by means of pins 36, and are connected to the adjusting member 35 by means of pin-and-slot couplings or connections 37, 19a.

In accordance with the present invention, the adjusting member 35 which is not actuated by the shutter drive mechanism of FIG. 5 is connected with the setting ring 8 of the diaphragm to be operated in response to shifting movement of said ring. Moreover, the control over the shutter blades 19 effected by the rings 35 and 8 is such that the shutter blades will have different sizes of openings when fully opened upon release of the shutter, the said openings of the shutter being at least as large as the apertures effected by the diaphragm for the various settings of the latter as effected by shifting of the setting ring 8.

When such an arrangement is utilized in a camera wherein separately operable speed and diaphragm setting devices are utilized there is had the important advantage previously mentioned that it is possible to obtain a constant effective shutter speed or exposure time for the entire range of diaphragm values or settings while the speed setting member 9 is kept at one specific setting position, and this may be accomplished without involving any changes in the driving force or driving mechanism for the shutter.

Further, in accordance with the invention, the above control effected over the shutter blades by the diaphragm setting mechanism effects a substantial increase in the operating range of the shutter, as compared with prior shutter structures, when utilized in a camera of the type illustrated in the drawings which employs a single setting member calibrated in exposure values. For effecting conjoint control of the speed and diaphragm for this purpose, the setting rings 8 and 9 for diaphragm and shutter speed are so arranged, by the present invention, as to enable the exposure value setting member 2 which controls said rings to have an additional adjusting range after reaching a setting position near one of its limits of movement, which position is characterized by the smallest diaphragm aperture and the shortest possible exposure time with the shutter providing an exposure opening substantially equal in size to the largest possible diaphragm aperture. For such additional adjusting range of the single exposure value setting member 2 the diaphragm is held constant and provides the smallest aperture while the further adjusting movement of the setting member 2 effects a graded series of different sizes of full openings of the shutter blades (when the latter are operated for exposures) the said series of sizes terminating with a full shutter opening corresponding to the smallest diaphragm aperture. Also, for such additional adjusting range of the single setting member 2 the driving force of the shutter drive system as shown in FIG. 5 is maintained at a magnitude which is at least as great as that required for obtaining the fastest shutter speed, that speed which is had when the single setting member is at the said setting position near one limit of its movement.

As is apparent from FIGS. 6 and 8, and as already stated above, the cams 8b and 9c for the diaphragm and shutter speed extend over a range of from 0 alpha to 22 alpha. According to the foregoing table showing the correlation of shutter speed and diaphragm aperture with the setting positions 0 alpha to 22 alpha, the setting position 3 alpha is associated with the exposure value pair $\frac{1}{250}$ sec.—diaphragm 22. Let us assume that this is the above-mentioned setting position of the single setting member 2 which is located near the end or limit of its movement and which corresponds to the smallest diaphragm aperture and the shortest exposure time that can be obtained with the shutter of the camera arranged to open to the largest possible size, equal to the largest diaphragm aperture i.e., a diaphragm aperture of 2.

For such condition the range from 3 alpha to 0 alpha would be the said additional adjusting range of the exposure value setting member 2, in which range the opening effected by the shutter blades when the shutter is released, is made variable and constitutes a series ranging from the largest opening to smaller and smaller openings until there is finally obtained a shutter opening which is equal in size to the smallest diaphragm aperture, i.e., an aperture value of 22.

The above-mentioned control of the shutter blades 19 results in a shortening of the total open time of the shutter for the reason that the blades, due to a greater overlapping when in closed condition are required to travel over a longer path to the point where the actual opening of the shutter commences, and thereafter to travel a shorter path from the said point of actual opening to the turning point or point of reversal of movement, as compared with shutter blades which overlap to only a slight extent and with which the actual start of the shutter aperture occurs after a relatively short initial motion.

A shutter provided in accordance with the invention in the above-described manner has the important advantage that a photograph can be taken even under extreme light intensities and with a very highly sensitive film. For example, starting with the assumption that at the greatest possible light intensity and with a film of 21° DIN the exposure-value pair $\frac{1}{250}$ sec.—diaphragm 22 produces a negative which just barely misses being over-exposed, a shutter constructed in accordance with the invention as described in the above embodiment, enables a film to be used which has a maximum sensibility of 30° DIN. The operating range of the camera has thus been extended by three exposure values, when the present improved shutter is substituted for an ordinary shutter.

FIGS. 3 and 4 show the blade driving and control or adjusting members 18 and 35 for the shutter blades 19, in the positions which they occupy when the exposure value setting member 2 is placed in the setting position 0 alpha. In contradistinction to FIG. 2, which shows a shutter blade 19 in normal position with the shutter closed, i.e. in a position corresponding to the setting of the diaphragm at its largest aperture, FIG. 3 illustrates the above-mentioned increased overlapping of the shutter blades when the shutter is closed.

As has already been stated, the shutter blades 19 are additionally adjusted or positioned when the single exposure value setting member is in the range from 3 alpha to 0 alpha for the purpose of continuing the monotonous exposure value gradation which exists beyond the 3 alpha value. This means, in accordance with the showing of the table above set forth, that the exposure time which in the position 3 alpha is $\frac{1}{250}$ sec. with a diaphragm opening of 22, is reduced to $\frac{1}{500}$ sec. for position 2 alpha, and further reduced to $\frac{1}{2000}$ sec. in the position 0 alpha.

Further, in accordance with the present invention, there is provided a novel and advantageous transmission means or device to effect the said adjustment or control of the shutter blades 19 in response to adjustment of the diaphragm setting ring 8, the said device having maximum dimensions which are sufficiently small to enable it to be incorporated without special difficulty in the interior of the shutter and which device further is simple in its construction and involves relatively few, easily fabricated structural members.

This transmission device, having the above features, for effecting the control of the positions of the shutter blades is illustrated in FIGS. 2, 3 and 4.

As may be seen from these figures, the driving and adjusting members 18 and 35 for the shutter blades 19 are constituted as two rings which are arranged concentrically with respect to the shutter axis, one of said rings as already mentioned cooperating with the driving mechanism for the shutter whereas the other is drivingly connected to the diaphragm setting device 8. The present transmission means for effecting the cooperable connection between the rings 35 and 8 comprises a lever 38 which carries on one arm a pin 39 extending into a control slot 8c connected wth the diaphragm setting member 8. The other arm of the lever 38 is connected with the ring 35 by means of a pin-and-solt connection 35a, 38a.

This cooperable connection or transmission device between the adjusting ring 35 and the actuating ring 8 of the diaphragm has the advantage that the position and motion of the shutter blades are always clearly defined and positively controlled.

The pivotal lever 38, in the illustrated embodiment of the invention, is a two-armed lever which is pivotally mounted on the rear of the shutter base plate 10 by means of a pivot pin 40, one arm 38b carrying the pin 39 which projects into the control slot 8c. The other arm 38c of the lever is bifurcated and cooperates with a lug 35a which is provided on the adjusting ring 35.

However, the invention is not limited to a double-armed lever of the kind shown in FIGS. 2, 3 and 4, since it is possible to arrange a transmission by the use of a one-armed lever or to effect other types of cooperable connections between the control slot 8c and the ring 35.

As is apparent from FIGS. 7 and 8, the control slot 8c as well as the control cams 8b and 9c have an extension of 22 alpha. Within this range, the control slot 8c runs from 3 alpha to 22 alpha concentrically with the shutter axis, and has a slope between 3 alpha and 0 alpha, wherein the shutter blades 19 are influenced and positioned by actuation of the ring 35.

It should now be apparent that the shutter blades 19 are mounted on two rings 18 and 35 which are arranged concentrically with the shutter axis and rotatable independently of each other. One of these two rings, the first ring 18, is in driving connection with the shutter driving device 11 to 17 shown in FIG. 5 for the purpose of opening and closing of the shutter blades 19 during the running down of the exposure, while the second ring 35 is coupled with the diaphragm setting control ring 8. This diaphragm setting ring 8 has the arcuate-shaped control slot 8c, which is formed throughout its major extent in a concentric pattern with the shutter axis but at one end has a radially-ascending portion. Cooperating with the control slot 8c is the two-armed lever 38 pivoted on a pivot 40 received in a threaded bore of the shutter base plate 10 with arm 38b carrying the pin 39 depending into the control slot 8c, while its other arm 38c has a bifurcation 38a that pivotally receives lug 35a of the second ring 35 to operate the shutter blades 19.

As long as the major concentric extent of the control slot 8c with rotation of the diaphragm setting ring 8, the pin 39 of the lever 38 stays in place and the setting and starting positions of the second ring 35 and the shutter blades are maintained. The shutter blades 19 will show a constant, yet small overlapping over the entire adjusting extent of the concentric portion of the control slot 8c, so that the shutter blades 19 release the full exposure aperture upon the running down of the exposure.

As illustrated in FIGS. 7 and 8, the diaphragm setting ring 8 has in addition to the control slot 8c, a cam edge 8b opposing said slot 8c which serves for the diaphragm setting and which, as diaphragm setting ring 8 is rotated, acts by way of the lever 31 and the actuating ring 28 of the diaphragm sectors 27. Also fixedly associated with the setting ring 8 is the speed setting control ring 9. These two setting rings 8 and 9 are connected to each other through the value setting ring so as to prevent relative rotation therebetween, there being provided on the speed setting ring 9, a cam 9c which serves to set an exposure time escapement mechanism. The arrangement of this cam 9c of the speed setting ring 9 with respect to the control slot 8c of the diaphragm setting ring 8 is made in such a manner that exposure times of the order of magnitude from 1/30 sec. to 1/250 sec. are obtained in the range of the concentric extent of the control slot 8c, and by influencing the exposure time escapement mechanism.

In order to be able to obtain exposure time of shorter duration, for example, of the order of magnitude of 1/500 sec. to 1/2000 sec. with the available driving force of the shutter, an arrangement has accordingly been provided to change the overlapping of the shutter blades 19 in their starting position. This is done while the smallest diaphragm aperture at twenty-two alpha is maintained, for which purpose the concentric extent from zero alpha to three alpha of the diaphragm setting cam 8b is provided. The change of the starting position of the shutter blades 19 is effected during radially-ascending slope extent of the slot 87 associated with the concentric extent thereof, in such a manner that, upon the pin 39 entering this radially-ascending extent or slope, the lever 38 executes a pivoting motion in a clockwise direction as viewed in FIG. 2, which, in turn, has the effect that the second ring 35 is rotated counterclockwise and, consequently, the shutter blades 19 are shifted to a new starting position causing them to be overlapped to a larger extent. This has been illustrated, in FIGS. 3 and 4, which show the diaphragm setting control ring 8 provided with the control slot 8c in the radially-ascending end position of which the shutter blades 19 show the greatest overlapping. Independently of the size or the degree of the overlapping, the swinging-out width of the shutter blades 19 is always the same during the running down of the exposure. Upon a setting of an extremely short exposure time, only the starting or initial position of the shutter blades 19 to the shutter axis is changed, and in such a manner that, upon a reduction of the shutter opening to be released, a greater overlapping of the shutter blades 19 in their starting position is brought about, and upon an increase of the shutter opening, a smaller overlapping is brought about. This in turn, means that, upon great overlapping, the shutter blades 19 must first travel a comparatively long path of motion to the start of the actual shutter opening and, from that moment on, a short path to the point of reversal, whereas, upon little overlapping the moment of the release of the shutter opening already occurs after a short starting motion of the shutter blades 19, and same is then followed by a comparatively long path to the point of reversal. This makes it possible to obtain a constant effective exposure time over the entire diaphragm range, and this without any change of the driving forces of the shutter, i.e., only due to the fact that the shutter opening released by the shutter blades 19 is reduced successively by increasing the overlapping.

I claim:

In a camera, a lens shutter structure 1 having a side wall 1a with a forward radially-outwardly-extending flange 1b, an exposure meter value setting ring device 2 concentrically mounted about the shutter side wall for rotation thereabout, a control ring 3 coupling the exposure meter setting device with the lens shutter structure 1, said control ring 3 bearing against the shutter side wall 1a and having a helical cam 3a on its rear edge adapted for operative connection with a pin follower of an exposure meter, said control ring 3 being restrained against forward axial movement upon said lens shutter structure by the forward flange of the side wall, said exposure value setting ring device comprising two concentric rings overlying one another and connected together, a front plate 5 carried by the exposure meter value setting ring device, one of the concentric setting device rings having an internal flange 2d for holding the front plate against rearward displacement, a range setting ring 6 lying forwardly of the front plate upon the lens shutter structure adapted to actuate an adjustable front lens, said range setting ring 6 having a range scale, said front plate having a stationary index mark 7 for reference thereto, a diaphragm setting control ring 8 rotatably carried upon said lens shutter structure and operably connected to the exposure meter value setting ring device 2 and adapted to be connected to a diaphragm setting mechanism, a speed setting control ring 9 rotatably carried upon the lens shutter structure overlying the forward edge of the side wall thereof and operably connected with the internal flange 2d of the exposure meter value setting ring device 2 and adapted to operate a speed setting mechanism, said exposure meter value setting ring device operating through the diaphragm and speed setting control rings so that the diaphragm and speed setting mechanisms may be adjusted together to set simultaneously the diaphragm and exposure time, said lens shutter structure having a base plate 10 adapted to position the parts of a shutter drive mechanism, a spring-biased tension and driving disc 12 pivoted on the base plate 10, and adapted to be connected to a film advancing mechanism, a shutter blade operating ring 18 rotatably mounted on the base plate 10 for opening and closing shutter blades 19, a catch link 16 pivotally secured to the drive disk 12 and releasably connected to the shutter blade ring 18, a spring biased two-armed locking lever pivoted on said base plate to hold the tensioning and driving disk 12 in a cocked position, a spring biased release lever 24 pivotally mounted upon the base plate and releasably connected with the two-armed locking lever, said spring biased release lever being adapted to be connected to the camera release device, said lens shutter structure having a rear wall 1d rearwardly spaced from the base plate to provide room for the shutter blades, a diaphragm setting control ring 8 rotatably carried upon said shutter rear wall and rotatably spring biased in one direction, a two-armed lever 31 pivoted on the said lens shutter structure rear wall and one arm 31a operatively engaging said diaphragm setting ring, a cam 8b carried by the diaphragm setting ring 8 connected to the meter exposure value setting ring device and engaged by the other arm 31b of said latter two-armed lever to be operated thereby, said speed setting control ring 9 having an arcuately-extending exposure time cam formation 9c, said diaphragm setting ring adapted to set the diaphragm from zero alpha to twenty-two alpha, said speed control ring 9 having an arcuate slot 9d adaped to receive a spring urged arm 34 of a bulb exposure device, said arcuate slot 9d being shaped at one end 9e to hold this spring urged arm 34 against shifting of the speed control ring 9 over the adjusting range between zero alpha to twenty-two alpha positions, said spring urged arm being releasable only at the twenty-two alpha position of the speed control ring 9 to maintain the shutter in the open position for bulb exposures, an adjusting ring member 35 for controlling the shutter blades concentric with the shutter blade operating ring 18, pin and slot means 37 and 19a connecting the shutter blades to said adjustable ring member 35, said adjustable ring member 35 being connected with the diaphragm setting control ring 8 to be operated in response to the shifting movement thereof thereby to provide in effect for different size openings of the shutter, a second two-armed lever, one of which having a lost-motion connection with said adjustable ring member 35 and the other arm 38b thereof having a depending follower pin 39, said diaphragm setting control ring 8 having a control slot 8c receiving said lever depending pin 39, this control slot 8c receiving said lever depending pin 39, this control slot 8c running concentrically with the shutter axis throughout substantially the range from three alpha to twenty-two alpha positions and has a radially-ascending slope between three alpha and zero alpha positions to influence the shutter blades by the actuation of said adjustable ring member 35, whereby to provide a series of different size shutter openings in response to the movement of the exposure meter value setting ring device, these different size openings ranging from substantially equal to the largest diaphragm opening to that substantially equal to the smallest diaphragm opening.

References Cited in the file of this patent
UNITED STATES PATENTS

| | | |
|---|---|---|
| 524,670 | Rudolph | Aug. 14, 1894 |
| 798,595 | Brueck | Sept. 5, 1905 |
| 2,969,007 | Groger | Jan. 24, 1961 |